United States Patent [19]
Phillips et al.

[11] Patent Number: 4,637,926
[45] Date of Patent: Jan. 20, 1987

[54] METHOD OF REMOVING HYDROGEN SULPHIDE FROM GASES

[75] Inventors: Emyr Phillips, Sale; Brian Holt, Stretford, both of England

[73] Assignee: Ciba-Geigy Corporation, Ardsley, N.Y.

[21] Appl. No.: 758,013

[22] Filed: Jul. 24, 1985

[30] Foreign Application Priority Data

Aug. 1, 1984 [GB] United Kingdom ............... 84 19820

[51] Int. Cl.$^4$ ..................... C01B 17/02; B01D 53/34
[52] U.S. Cl. ................................. 423/573 R; 423/226
[58] Field of Search ..................... 423/573 R

[56] References Cited

U.S. PATENT DOCUMENTS 3,035,889  5/1962  Nicklin et al. ............... 423/573
4,251,493  2/1981  Randell et al. ............... 423/226

FOREIGN PATENT DOCUMENTS 8640    3/1980  European Pat. Off.
948270  1/1964  United Kingdom.

Primary Examiner—John Doll
Assistant Examiner—Lori S. Freeman

Attorney, Agent, or Firm—Luther A. R. Hall; Harry Falber

[57] ABSTRACT

Process for the absorption of hydrogen sulphide impurity from gases or liquid hydrocarbons comprising:

(a) washing the gas or liquid hydrocarbon containing hydrogen sulphide with an aqueous alkaline solution of
  (a1) one or more compounds having the formula:

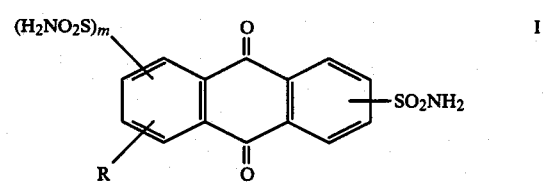

or a water-soluble salt thereof, wherein m is 0 or 1 and R is a hydrogen atom or a methyl or carboxy group, and
  (a2) one or more compounds of a metal capable of existing in at least two valency states;
(b) removing sulphur formed by oxidation of hydrogen sulphide; and
(c) re-oxidizing the hydroquinone formed from reduction of the compound of formula I.

12 Claims, 2 Drawing Figures

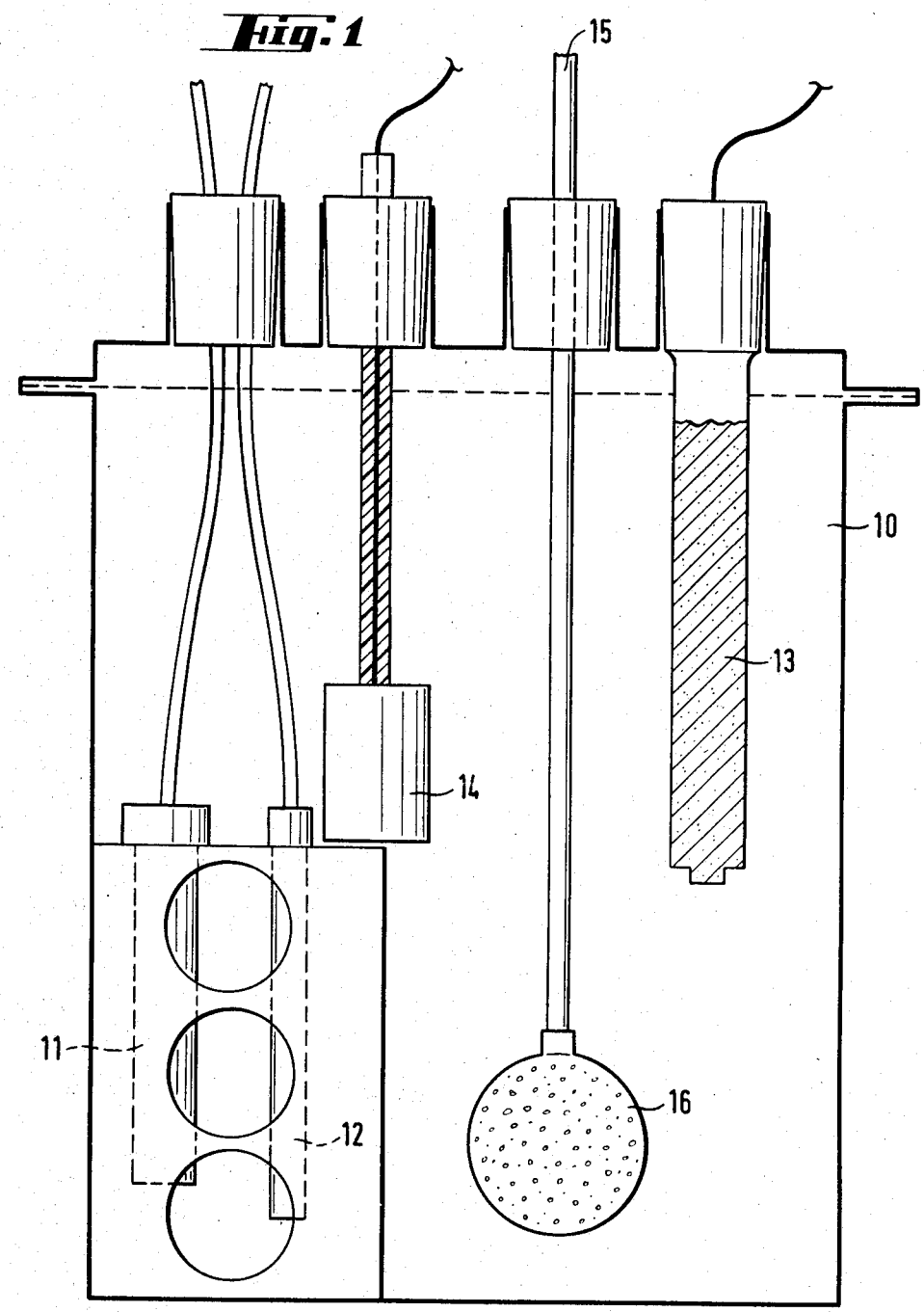

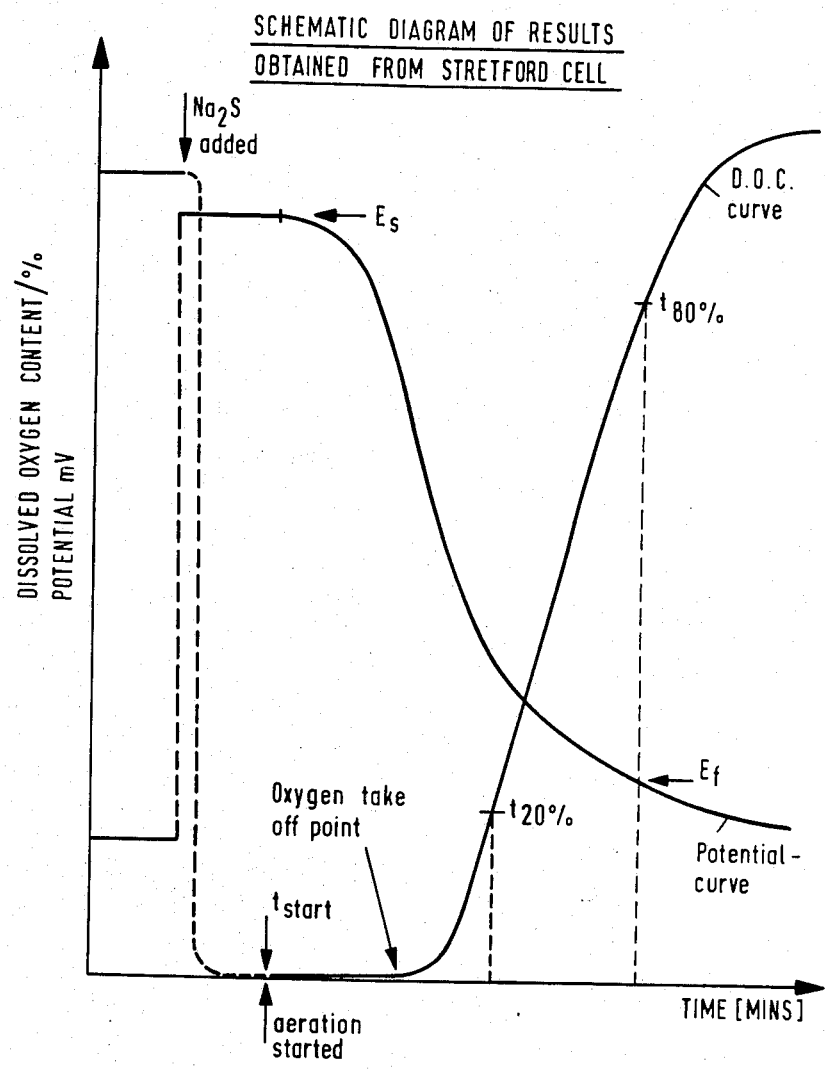

METHOD OF REMOVING HYDROGEN SULPHIDE FROM GASES

The present invention relates to a purification process, especially to a process for removing hydrogen sulphide impurity from gases or liquid hydrocarbons.

The removal of hydrogen sulphide, as sulphur, from gases is described in British Patent Specification Nos. 871,233 and 948,270 in which certain anthraquinone disulphonic acids are used as oxidising agents. Subsequently, in British Patent Specification No. 2029386, there were described certain N-substituted anthraquinone sulphonamides having activity at least as high as the said anthraquinone disulphonic acids when used in processes to remove hydrogen sulphide from gases.

We have now found that the anthraquinone sulphonamide intermediates described in GB Specification No. 2029386 are also effective in processes for removing hydrogen sulphide from gases or liquid hydrocarbons.

Accordingly, the present invention provides a process for the absorption of hydrogen sulphide impurity from gases or liquid hydrocarbons comprising:
(a) washing the gas or liquid hydrocarbon containing hydrogen sulphide with an aqueous alkaline solution of
(a1) one or more compounds having the formula (I):

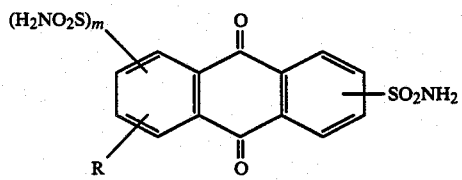

or a water-soluble salt thereof, wherein m is 0 or 1 and R is a hydrogen atom or a methyl or carboxy group, and
(a2) one or more compounds of a metal capable of existing in at least two valency states;
(b) removing sulphur formed by oxidation of hydrogen sulphide; and
(c) re-oxidising, preferably using oxygen or a gas containing oxygen, the hydroquinone formed from reduction of the compound of formula (I).

If necessary, the aqueous alkaline solution used in step (a) may contain one or more chelating or sequestering agents for retaining the compounds (a2) in solution.

The compounds of formula I are known compounds and may be prepared by well-known techniques. Thus, the compounds of formula I may be prepared by reacting halosulphonic acid derivatives of anthraquinone having the formula:

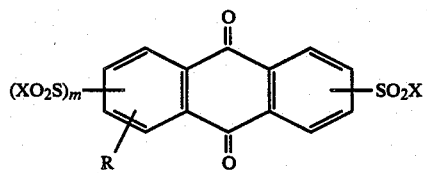

wherein m and R have their previous significance and X is halogen with ammonia. Compounds of formula II are known compounds which may be prepared by the method described by Kozlov et al., J. Gen. Chem. Russ. 1947, 17, 289.

The compounds of formula I may also be prepared by the method described in Tr. Leningr. Khim-Farmatseut. Inst. 1960, 11, 48. This method is in fact preferred since it gives a product substantially free from chloride ions, which can cause corrosion problems in treatment plants for removing hydrogen sulphide.

The pH value of the aqueous alkaline solution used in step (a) is preferably within the range of from 7 to 10, especially from 9.0 to 9.5. In these preferred pH ranges, the compound of formula I will be present in salt form, the cation of the salt being preferably sodium, potassium or ammonium, depending on the alkaline agent which is used to render alkaline the aqueous solution of the compound of formula I. If an ammonium salt of the compound of formula I is present, it may be a substituted ammonium salt e.g. an optionally substituted $C_1$-$C_6$-alkyl-ammonium salt e.g. methyl-, ethyl-, propyl-, butyl- or mono-, di- or trihydroxyethyl ammonium salts.

The compound of a metal, especially vanadium, having at least two valency states, component (a2) used in step (a) of the process, may be, e.g. an ortho-, meta- or pyrovanadate of ammonia, or of an alkali metal such as sodium or potassium. Examples of suitable compounds (a2) are sodium ammonium vanadate and sodium orthovanadate.

Part, at least, of the preferred vanadium compound may be replaced by one or more metals having at least two valency states e.g. iron, copper, cobalt, chromium, manganese and nickel.

If a sequestering agent for component (a2) is used, suitable examples are citric acid and tartaric acid; another convenient substance is a compound having the formula:

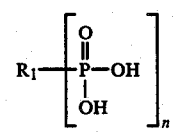

wherein $R_1$ is an aliphatic residue containing from 1 to 12 carbon atoms and optionally substituted or interrupted by one or more hydroxy and/or carboxy groups; a carbonyl group; a phenyl group; an aralkyl group containing 7 to 10 carbon atoms; and n is 1-4; as well as its salts, especially alkali metal or ammonium salts, and esters. Particularly preferred compounds of formula III are 1,1-hydroxyethylidene diphosphonic acid and methane phosphonic acid and their esters and salts.

Preferably, the amount of the compound of formula I present in the aqueous alkaline solution used in step (a) is from 10 to 400 ppm, especially 20 to 100 ppm. Preferably the amount of the compound of a metal having at least two valency states present in the aqueous alkaline solution used in step (a) is from 500 to 4000, especially 1000 to 2500 ppm; and preferably the amount of any sequestering agent, e.g. a compound of formula III used is within the range of from 10 to 7000 ppm, especially from 200 to 4000 ppm.

Examples of preferred compounds of formula I are the mono- and di-sodium, -potassium and -ammonium salts of:
anthraquinone-2,6-disulphonamide
anthraquinone-2,7-disulphonamide
anthraquinone-1,5-disulphonamide anthraquinone-1,8-disulphonamide
and mixtures thereof.

Sulphur precipitated during the process of the invention may be recovered by any conventional technique e.g. filtration, before, during or after regeneration of the aqueous alkaline solution. The sulphur so recovered can be used e.g. in sulphuric acid production.

The process of the present invention can be applied successfully to any gas or liquid hydrocarbon stream contaminated with hydrogen sulphide. Such gas or liquid hydrocarbon streams may also contain other pollutive gases such as certain carbon-, nitrogen- and sulphur oxides, and hydrogen, organic sulphur compounds or hydrogen cyanide, some of which may also be removed in the process of the invention. Of particular interest however is the purification of coal gas, town gas and waste gas streams, and carbon dioxide-rich gas streams obtained from the combustion of coal, as well as liquid hydrocarbon streams, each containing hydrogen sulphide.

The process of the present invention provides an efficient means of reducing the hydrogen sulphide content of gas and liquid hydrocarbon streams. For example, coke-oven gas streams containing, typically, 1.54 weight % (1500 ppm) of hydrogen sulphide, after treatment according to the process of the present invention, have a hydrogen sulphide content of the order of 0.05 weight % (50 ppm). Moreover, the compounds of formula I are readily produced in a single-stage process.

The embodiments of this invention are further explained by reference to the accompanying drawings in which:

FIG. 1 is an elevated front view of a cell for use in evaluating the instant invention; and FIG. 2 is a schematic representation of the results obtained from the test cell of FIG. 1.

The following Example further illustrates the present invention.

EXAMPLE 1

A synthetic simulation of a gas-absorbing solution is prepared to give:

| | |
|---|---|
| 25 g/l | NaHCO$_3$ |
| 5 g/l | Na$_2$CO$_3$ |
| 10 g/l | Na$_2$S$_2$O$_3$ |
| 8 g/l | NaCNS |
| 3.8 g/l | NaVO$_3$ |
| 2 g/l | Catalyst |

The test solution has a solution pH of 9.0–9.2.

The cell in which the tests are carried out is illustrated in the accompanying FIG. 1 in which the cell 10 consists of a 1 liter vessel containing an oxygen electrode 11, a temperature compensation probe 12, calomel electrode 13, platinum electrode 14, air inlet 15, and an aeration sintered disc 16.

The dissolved oxygen content is measured on a dissolved oxygen meter and the redox potential measured on a high impedance digital multimeter. 1.5 liters of simulated gas-absorbing solution is prepared and 1 liter of the solution is transferred to the cell, where the solution is oxygenated and de-oxygenated three times by alternately passing air and nitrogen at flow rates of 500 mls/min. The solution is finally left in a de-oxygenated state.

A minimum amount of the de-oxygenated solution is used to dissolve 3.75 g of Na$_2$S which is then returned to the cell. Although the process is for the removal of H$_2$S the species formed when H$_2$S dissolves in an alkaline absorbing solution is the HS$^-$ ion. Therefore, for ease of operation of the test, the HS$^-$ ion is introduced by using Na$_2$S. The S$^{--}$ ion from Na$_2$S gives HS$^-$ at the solution pH of the simulated gas absorbing liquor. After the reduction with Na$_2$S, the redox potential and dissolved oxygen content are allowed to stabilise for 10 minutes while a low flow of nitrogen maintains agitation. The solution is then re-oxidised by passing air at a flow rate of 500 mls/min. The dissolved oxygen content and the redox potential are monitored continuously. The oxidation is continued until the redox potential and dissolved oxygen concentration have stabilised. The solution is then de-aerated by passing nitrogen at a flow rate of 500 mls/min, and further reduced by a fresh addition of 3.75 g of Na$_2$S. The procedure of reduction with further Na$_2$S and subsequent re-oxidation by air blowing (with measurements of dissolved oxygen concentration and redox potential) is carried out three times and the precipitated sulphur is filtered off after each cycle.

The accompanying FIG. 2 shows a schematic diagram of typical results obtained from the cell test.

The parameters which indicate the efficiency of the catalyst system are:

(i) $t_{20\%}$—time for the solution to reach 20% of the saturation concentration of dissolved oxygen (ii) $t_{80\%}$—time for the solution to reach 80% of the saturation concentration of dissolved oxygen (iii) the ratio of Es/Ef, where Es is the redox potential of the system in the fully reduced state and Ef is a measure of the redox potential of the system in an oxidised state. For convenience in our test Ef is taken as the redox potential at $t_{80\%}$.

The results quoted in Table 1 are the average of the data from three cycles of reduction and re-oxidation.

Table I shows a comparison of 2,7-anthraquinone disulphonic acid with anthraquinone-2,7-disulphonamide compound of the present invention.

TABLE I

| Example | Catalyst | Dissolved oxygen measurements | | Potential measurements | | Ratio of Es/Ef |
|---|---|---|---|---|---|---|
| | | $t_{20\%}$ mins | $t_{80\%}$ mins | Es | Ef | |
| — | anthraquinone-2,7-disulphonic acid | 9 | 16 | −430 | −197 | 2.2 |
| 1 | anthraquinone-2,7-disulphonamide | 6 | 10 | −452 | −166 | 2.7 |

Some of the reactions by which previously-gaseous oxygen is fixed in solution are ionic in nature and are comparatively rapid. Generally, as long as there remain ionic compounds in a reduced state in the liquor, the dissolved oxygen content remains at 5% or less of the saturation concentration of dissolved oxygen in the liquor. Therefore, the state (reduced or oxidised) of these components of the solution can be determined by measuring the dissolved oxygen concentration. The re-oxidation times $t_{20\%}$ and $t_{80}$ therefore give indications of the rate of system re-oxidation in the presence of the various catalysts.

The process, being an oxidative process, is dependent upon redox couples. The degree of oxidation of the solution determines the redox potential. Thus the degree of oxidation is measured instantly by measuring the redox potential.

The liquor consists of a mixture of at least three redox couples. The single electrode potential is related logarithmically to the concentration of the oxidised and reduced species in solution:

Potential = Standard Potential +

$$\text{constant} \times \log_{10} \frac{\text{(Concentration of Oxidised forms)}}{\text{(Concentration of Reduced forms)}}$$

The ratio of Es/Ef has been taken by other workers to indicate the degree of re-oxidation that has occurred. The effectiveness of a catalyst can be decided from the combination of dissolved oxygen measurements and redox potential measurements. The results generally obtained with the cell test appear to fall into three main types:

(i) those which have long times to $t_{20\%}$
  (i.e. 30 Mins. or greater) but have a high ratio of Es/Ef
  (i.e. 2.2 or greater)
(ii) those which have intermediate times to
  $t_{20\%}$ (i.e. about 10 mins) and a high ratio of Es/Ef
  (i.e. 2.2 or greater)
(iii) those which have fast times to $t_{20\%}$
  (i.e. 1–3 mins) but have a low ratio of Es/Ef
  (i.e. <2.0)

The interpretation of these results is that type (i) is a slow but effective catalyst, type (ii) is an effective catalyst, and type (iii) is an ineffective catalyst.

When the dissolved oxygen concentration in the solution has reached 20% of the saturation concentration, the majority of the redox reaction has taken place. There is ample dissolved oxygen available so the time from $t_{20\%}$ to $t_{80\%}$ is mainly a function of the reactivity of the catalyst. Therefore, the smaller the time interval between $t_{20\%}$ to $t_{80\%}$ the more easily the catalyst is re-oxidised and provided the ratio of Es/Ef is greater than 2.2, the more effective the catalyst would be in the system.

It can be seen that the compounds of formula I falls into the type (ii) category and has an activity superior to that of 2,7-anthraquinone disulphonic acid.

What we claim is:

1. Process for the absorption of hydrogen sulphide impurity from gases or liquid hydrocarbons comprising:
   (a) washing the gas or liquid hydrocarbon containing hydrogen sulphide with an aqueous alkaline solution of
   (a1) one or more compounds having the formula:

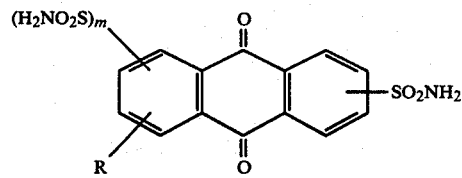

or a water-soluble salt thereof, wherein m is 0 or 1 and R is a hydrogen atom or a methyl or carboxy group, and
   (a2) one or more compounds of a metal capable of existing in at least two valency states;
   (b) removing sulphur formed by oxidation of hydrogen sulphide; and
   (c) re-oxidising the hydroquinone formed from reduction of the compound of formula I.

2. Process according to claim 1 wherein the pH value of the aqueous alkaline solution used in step (a) is within the range of from 7 to 10.

3. Process according to claim 2 wherein the pH value of the aqueous alkaline solution used in step (a) is within the range of from 9.0 to 9.5.

4. Process according to claim 1 wherein the compound of formula I is used as its sodium, potassium or ammonium salt.

5. Process according to claim 1 wherein the metal capable of existing in at least two valency states is vanadium.

6. Process according to claim 5 wherein the vanadium is used as sodium ammonium vanadate or sodium orthovanadate.

7. Process according to claim 1 wherein the amount of the compound of formula I used is from 10 to 400 ppm.

8. Process according to claim 7 wherein the amount of the compound of formula I used is from 20 to 100 ppm.

9. Process according to claim 1 wherein the amount of the compound of a metal having at least two valency states used is from 500 to 4000 ppm.

10. Process according to claim 9 wherein the amount of the compound of a metal having at least two valency states used is from 1000 to 2500 ppm.

11. Process according to claim 1 wherein the compound of formula I is the mono- or di-sodium, -potassium or -ammonium salt of
   anthraquinone-2,6-disulphonamide
   anthraquinone-2,7-disulphonamide
   anthraquinone-1,5-disulphonamide
   anthraquinone-1,8-disulphonamide
   or mixtures thereof.

12. Process according to claim 1 wherein, in step (c), the hydroquinone formed is re-oxidised to the compound of formula I using oxygen or a gas containing oxygen.

* * * * *